(12) United States Patent
Keithley (10) Patent No.: US 8,237,103 B1
(45) Date of Patent: *Aug. 7, 2012

(54) MECHANICAL GALVANOMETER TILT CORRECTION CONTROL

(75) Inventor: Douglas G. Keithley, Boise, ID (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,554

(22) Filed: May 2, 2011

Related U.S. Application Data (63) Continuation of application No. 11/956,958, filed on Dec. 14, 2007, now Pat. No. 7,943,896.

(60) Provisional application No. 60/871,031, filed on Dec. 20, 2006.

(51) Int. Cl.
  *G02B 27/00* (2006.01)
  *H01J 3/14* (2006.01)
  *B41J 15/14* (2006.01)

(52) U.S. Cl. ......... 250/230; 250/235; 250/236; 347/250

(58) Field of Classification Search .............. 250/201.1, 250/230, 234, 235, 236; 347/235, 243, 250, 347/260, 261
See application file for complete search history.

(56) References Cited

U.S. PATENT DOCUMENTS

| | | | |
|---|---|---|---|
| 4,571,712 A | 2/1986 | Romano et al. | |
| 5,629,790 A | 5/1997 | Neukermans et al. | |
| 7,187,400 B2 | 3/2007 | Bush | |
| 7,245,412 B2 | 7/2007 | Bruland et al. | |
| 7,301,554 B2 | 11/2007 | Kubo | |
| 7,518,628 B2 | 4/2009 | Shukuya | |
| 7,943,896 B1 * | 5/2011 | Keithley | 250/230 |
| 2004/0119813 A1 | 6/2004 | Bush et al. | |
| 2004/0125193 A1 | 7/2004 | Kubo | |
| 2005/0213230 A1 | 9/2005 | Mochizuki | |
| 2006/0132880 A1 | 6/2006 | Amada et al. | |
| 2007/0127003 A1 | 6/2007 | Aikawa | |

* cited by examiner

*Primary Examiner* — John Lee
(74) *Attorney, Agent, or Firm* — Brinks Hofer Gilson & Lione (57) ABSTRACT

A mechanical galvanometer tilt control system includes two beam detection sensors that detect vertical displacement caused by the horizontal rotation of a galvanometer and the vertical rotation of a photoconductive drum. The galvanometer may be in communication with a mirror holder that holds a mirror. The mirror holder may be operable to horizontally rotate the mirror as the mirror reflects a light beam onto a photosensitive image forming surface of the photoconductive drum. The two beam detection sensors receive the reflected light beam as the galvanometer generates one or more forward-going and one or more reverse-going scanlines on the photosensitive image forming surface. The mechanical galvanometer tilt control system may further determine an amount of vertical correction required to correct for the vertical displacement caused by the rotation of the galvanometer and the rotation of the photoconductive drum.

20 Claims, 6 Drawing Sheets

MECHANICAL GALVANOMETER TILT CORRECTION CONTROL

CROSS-REFERENCE TO RELATED APPLICATIONS

This application is a continuation of U.S. application Ser. No. 11/956,958, filed Dec. 14, 2007, which claims priority under 35 U.S.C. §119(e) to U.S. Provisional Application No, 60/871,031, filed Dec. 20, 2006. The disclosures of the applications referenced above are incorporated herein by reference

BACKGROUND

This application relates to correcting the appearance of vertical tilt caused by rotation of a mechanical galvanometer in relation to the rotation of a photoconductive drum. In particular, this application relates to a beam detection sensor used to correct for the appearance of vertical tilt caused by the rotation of a mechanical galvanometer and the rotation of a photoconductive drum.

Galvanometer use in laser printers has recently increased. A laser printer using a single galvanometer will often have a light reflecting mirror mounted to the galvanometer. In other laser printers, a galvanometer is made from a single silicon wafer and polished to get a mirror finish on an intended reflective surface. The laser printer uses a light source that generates a light beam, which is reflected by the mirror or the polished galvanometer onto a photo-sensitive image forming surface, such as the surface of a photoconductive drum. As the light beam is reflected onto the surface of the photoconductive drum, the galvanometer horizontally rotates the mirror across the photo-sensitive image forming surface. The rotation of the mirror, and the resulting movement of the light beam across the photo-sensitive image forming surface, produces forward-going and reverse-going scanlines.

However, while the galvanometer is horizontally rotating the mirror, the photoconductive drum is rotating vertically. Due to the movements of both the galvanometer and the photoconductive drum, the resulting forward-going and reverse-going scanlines are often vertically tilted with respect to each other. Laser printers that use a galvanometer to produce forward-going and reverse-going scanlines often do not account for the vertical tilt caused by the rotation of the galvanometer and the photoconductive drum, and are unable to determine this vertical tilt.

SUMMARY

The present invention is defined by the following claims, and nothing in this section should be taken as a limitation on those claims.

By way of introduction, the preferred embodiments described below provide a system that determines whether a reflected light beam is in proper vertical alignment. The system may include one or more beam detection sensors in communication with a mirror or polished surface of a galvanometer. In a preferred embodiment, two beam detection sensors are used to detect the vertical displacement of a reflected light beam. The system may further determine an amount of vertical correction to vertically align the reflected light beam with the two beam detection sensors. Other preferred embodiments are provided, and each of the preferred embodiments described herein can be used alone or in combination with one another.

The preferred embodiments will now be described with reference to the attached drawings.

DETAILED DESCRIPTION OF THE PRESENTLY PREFERRED EMBODIMENTS

Figure 1:
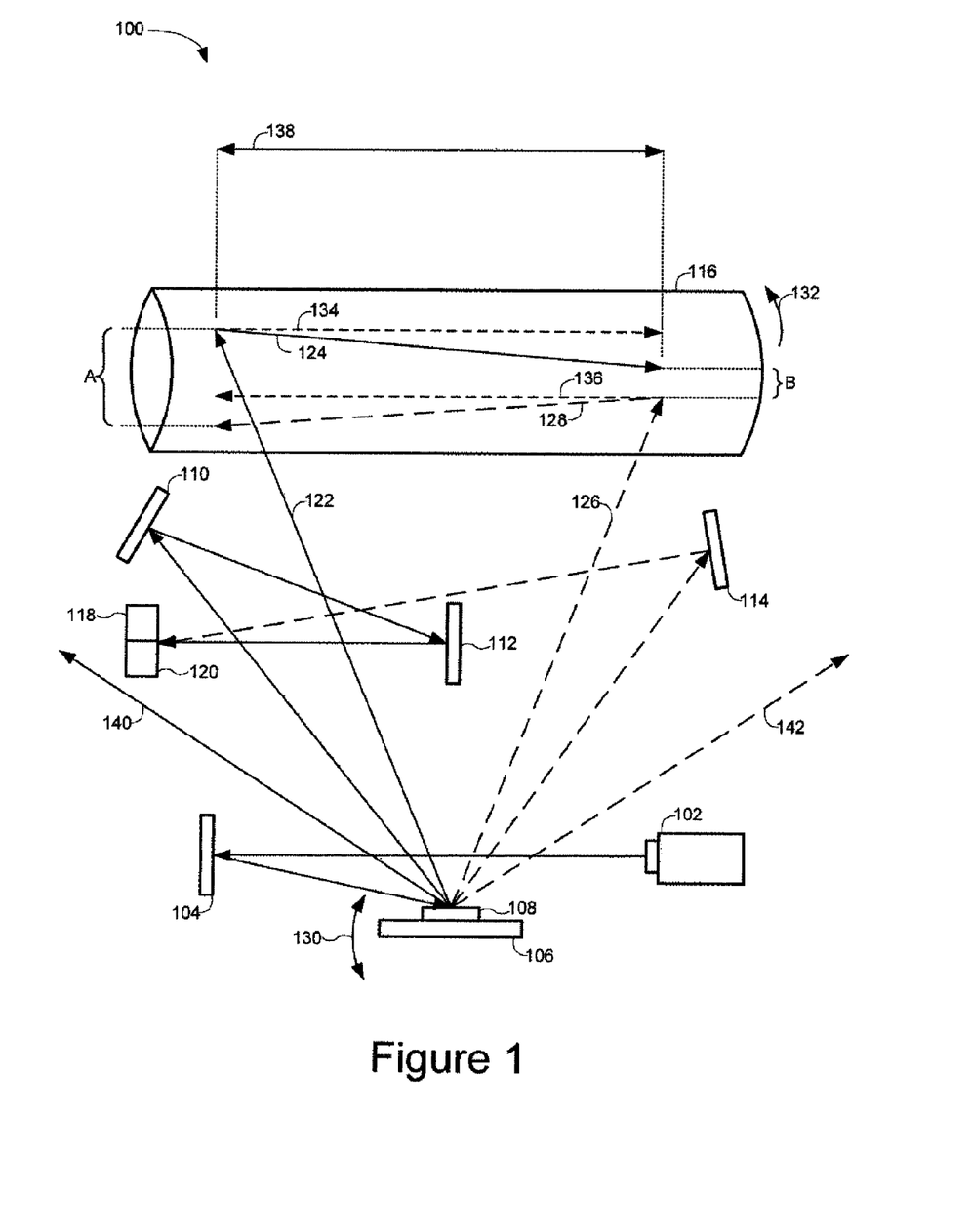
FIG. 1 is a functional block diagram of a preferred embodiment of an image forming system using two beam detection sensors to detect vertical displacement.

FIG. 1 is a functional block diagram of an image forming system 100. The image forming system 100 includes a galvanometer 106 in communication with a mirror 108. As used herein, a mirror is meant to include any type of surface that can reflect light. As one example, a surface of the galvanometer 106 may be polished, and the polished surface of the galvanometer 106 may reflect the light beam. A light source 102 generates a light beam that is reflected by a first mirror 104 onto the mirror 108. As used herein, a light beam may be visible light, infrared light, a laser, a stream of electrons, electromagnetic radiation ranging in wavelength from about 400 nm to 700 nm, any other type of light now known or later developed, or combinations thereof. The mirror 108 may then reflect the reflected light beam onto additional mirrors, including a second mirror 110, a third mirror 112, and a fourth mirror 114, before striking the surface of a photoconductive drum 116. A first beam detection sensor 118 and a second beam detection sensor 120 are in communication with the mirrors 110, 112, and 114 such as to detect the reflected light beam when the reflected light beam sweeps across the first beam detection sensor 118 and the second beam detection sensor 120.

The galvanometer 106 may horizontally rotate the mirror 108 about a central axis where the axis is perpendicular with respect to the surface plane of FIG. 1. The horizontal rotation of the galvanometer 106 is depicted by a mechanical displacement angle 130. The mechanical displacement angle 130 may include any range of angles from 0° through 180°, inclusive. As the galvanometer 106 rotates, the mirror 108 sweeps the reflected light beam across the surface of the photoconductive drum 116. In one implementation, the light beam sweeps through an angle of deflection between and including reflected light beam 140 and reflected light beam 142. The angle of deflection between and including reflected light beam 140 and reflected light beam 142 may include any range of angles from 0° through 180°, inclusive. In one implementation, the change in the mechanical displacement angle 130 causes twice the change in the angle of deflection. For example, a 10° change in the mechanical displacement angle 130 may cause a 20° change in the angle of deflection.

The arrangement of the components shown in FIG. 1, including the galvanometer 106, the mirror 108, the mirrors 104, 110, 112, and 114, the photoconductive drum 116, the first beam detection sensor 118, and the second beam detection sensor 120, does not limit the possible arrangements of those components. Alternative arrangements are also possible. For example, more or less mirrors may be used to reflect the reflected light beam onto the first beam detection sensor 118, the second beam detection sensor 120, or combinations thereof. In addition, the arrangement of FIG. 1 may also include one or more optical lenses (not shown). In one implementation, the optical lenses shape the light beam. However, the optical lenses may also focus or adjust the velocity of the light beam. Although not shown, the optical lenses may be located in several places between the light source 102, the photoconductive drum 116, the mirrors 112 and 114, and the beam detection sensors 118 and 120.

FIG. 1 further shows that, in one implementation, the rotation of the galvanometer 106 causes the mirror 108 to reflect the light beam from the light source 102 in a forward-going direction and a reverse-going direction. For example, the solid lines illustrate a first horizontal scanning direction as the galvanometer 102 rotates clockwise. When the galvanometer 106 begins its rotation in a clockwise direction, the mirror 108 may first reflect light from the first mirror 104 in a direction indicated by forward-going reflected light beam 140. Forward-going reflected light beam 140 may be in a position that is not detectable by the first beam detection sensor 118, the second beam detection sensor 120, or combinations thereof. As the galvanometer 106 then rotates clockwise, the mirror 108 may then reflect the light beam onto the surface of the second mirror 110. In turn, the second mirror 110 may reflect the reflected light beam onto the surface of the third mirror 112. The third mirror may then reflect the reflected light beam towards the first beam detection sensor 118 and the second beam detection sensor 120.

As the galvanometer 106 is rotating clockwise, one or more forward-going reflected light beams strike the surface of the photoconductive drum 116. As the surface of the photoconductive drum 116 may be a photosensitive image forming surface, the striking of the forward-going reflected light beams produces one or more forward-going scanlines 124. In one implementation, the forward-going reflected light beams strike the surface of the photoconductive drum 116 beginning with the end of the forward-going reflected light beam 122. However, it is also possible that one or more forward-going reflected light beams strike the surface of the photoconductive drum 116 sooner or later than at the end of the forward-going reflected light beam 122.

Similarly, after the galvanometer 106 has reached the maximum point of clockwise rotation, such as 180°, the galvanometer 106 begins rotating in a counter-clockwise direction. The dashed lines of FIG. 1 illustrate a second horizontal scanning direction caused by the galvanometer 106 rotating the mirror 108 counter-clockwise. Initially, when the galvanometer 106 is rotating in a counter-clockwise direction, the mirror 108 may first reflect a light from the first mirror 104 in a direction indicated by reverse-going reflected light beam 142. Reverse-going reflected light beam 142 may be in a position that is not detectable by the first beam detection sensor 118, the second beam detection sensor 120, or combinations thereof. As the galvanometer 106 then rotates counter-clockwise, the mirror 108 may then reflect the light beam onto the surface of the fourth mirror 114. The fourth mirror 114 may then reflect the reflected light beam towards the first beam detection sensor 118 and the second beam detection sensor 120.

As the galvanometer 106 is rotating counter-clockwise, one or more reverse-going reflected light beams strike the surface of the photoconductive drum 116. As the surface of the photoconductive drum 116 may be a photosensitive image forming surface, the striking of the reverse-going reflected light beams produces one or more reverse-going scanlines 128. In one implementation, the reverse-going reflected light beams strike the surface of the photoconductive drum 116 beginning with the end of the reverse-going reflected light beam 126. However, it is also possible that one or more reverse-going reflected light beams strike the surface of the photoconductive drum 116 sooner or later than at the end of the reverse-going reflected light beam 126.

The forward-going scanlines 124 and the reverse-going scanlines 128 define an image area 138 on the surface of the photoconductive drum 116. However, the image area 138 may also be defined by the beginning and end of a forward-going scanline 124, the beginning and end of a reverse-going scanline 128, or combinations thereof. The image area 138 may also include only forward-going scanlines 124, only reverse-going scanlines 128, or combinations thereof.

The photoconductive drum 116 may also rotate while the galvanometer 106 is rotating clockwise and counter-clockwise. The rotational movement 132 of the photoconductive drum 116 may permit the image forming system 100 to form a latent image on the photoconductive drum 116 from one or more forward-going scanlines 124, one or more reverse-going scanlines 128, or combinations thereof. For example, the latent image may be formed within the image area 138. The latent image may then attract an image-forming material, such as toner, and the image-forming material may then be transferred to print media. In one implementation, the photoconductive drum 116 may rotate vertically upwards as shown by rotational movement 132.

The rotational movement 132 and the horizontal rotation of the galvanometer 106 causes the forward-going scanlines 124 and the reverse-going scanlines 128 to appear vertically tilted. For example, rather than be parallel, the forward-going scanlines 124 and the reverse-going scanlines 128 may be convergent, divergent, or combinations thereof. The vertical tilting caused by the rotational movement 132 and the horizontal rotation of the galvanometer 106 impacts the resulting printed image because the latent image on the photoconductive drum 116 will have imperfect and non-parallel scanlines. The imperfect scanlines on the latent image thus produces a printed image having varied darker and lighter print patterns across the printed page.

In FIG. 1, the vertically tilted distance between the start of a first forward-going scanline 124 and the end of a first reverse-going scanline 128 is depicted by distance A. Distance A may be measured in pixels, scanlines, any now known or later developed method of measurement, or combinations thereof. Similarly, the vertically tilted distance from the end of the first forward-going scanline 124 and the start of a first reverse-going scanline 128 is depicted by distance B. Distance B may be measured in pixels, scanlines, any now known or later developed method of measurement, or combinations thereof. For example, distance A may be measured as 1.5 scanlines and distance B may be measured as 0.5 scanlines.

In one implementation, the mirror 108 is configured to rotate through a mechanical displacement angle 130 of 28°. That is, the rotation of the mirror 108 causes an angle of deflection of 56°. Assuming that the image forming system 100 is configured to produce 600 dots per inch (DPI) on an 8.5" sheet of print media, the forward-going scanlines 124 may produce approximately 5,100 dots (or pixels) on the surface of the photoconductive drum 116. Similarly, the reverse-going scanlines 128 may also produce 5,100 dots (or pixels) on the surface of the photoconductive drum 116. Accordingly, 91 pixels per degree of the angle of deflection are produced as the mirror 108 rotates and reflects light beams 122,126 onto the surface of the photoconductive drum 116. Similarly, and in another example, assuming 1200 DPI and an 8.5" sheet of print media, 182 pixels per degree of the angle of deflection are produced as the mirror 108 rotates and reflects light beams 122,126 onto the surface of the photoconductive drum 116.

The rotational movement 132 of the photoconductive drum 116 may produce sets of forward-going scanlines 124 and reverse-going scanlines 128 separated by the distance B. A set of scanlines is one forward-going scanline 124 and one reverse-going scanline 128. Accordingly, in one implementation without corrective measures where a galvanometer 106 is configured to rotate both clockwise and counter-clockwise, each set of scanlines 124 and 128 are separated by the distance B. In this implementation, the image forming system 100 continuously repeats sets of scanlines 124 and 128 when forming an image on print media.

The first beam detection sensor 118 and the second beam detection sensor 120 are operable to detect the reflected light beam as the galvanometer 106 rotates clockwise and counter-clockwise. In one implementation, the first beam detection sensor 118 is mounted atop the second beam detection sensor 120. However, other arrangements of the first beam detection sensor 118 and the second beam detection sensor 120 are also possible.

In one implementation, the first beam detection sensor 118 and the second beam detection sensor 120 are each illuminated four times, that is, two times for each of the clockwise rotations and counter-clockwise rotations of the galvanometer 106. Beginning with the clockwise rotations, the first beam detection sensor 118 and the second beam detection sensor 120 are first illuminated when the reflected light beam strikes the first mirror 110. As the galvanometer 106 rotates, the reflected light beam strikes the surface of the fourth mirror 114, which illuminates the first beam detection sensor 118 and the second beam detection sensor 120 a second time. The galvanometer 106 may then rotate to a position where a reflected light beam 142 does not illuminate the beam detection sensors 118 and 120. As the galvanometer 106 begins its counter-clockwise rotations, the beam detection sensors 118 and 120 are then illuminated when a reflected light beam strikes the surface of the fourth mirror 114. Finally, as the galvanometer 106 is completing its counter-clockwise rotation, the reflected light beam strikes the surface of the first mirror 110, which illuminates the beam detection sensors 118 and 120 a fourth time.

Figure 2:
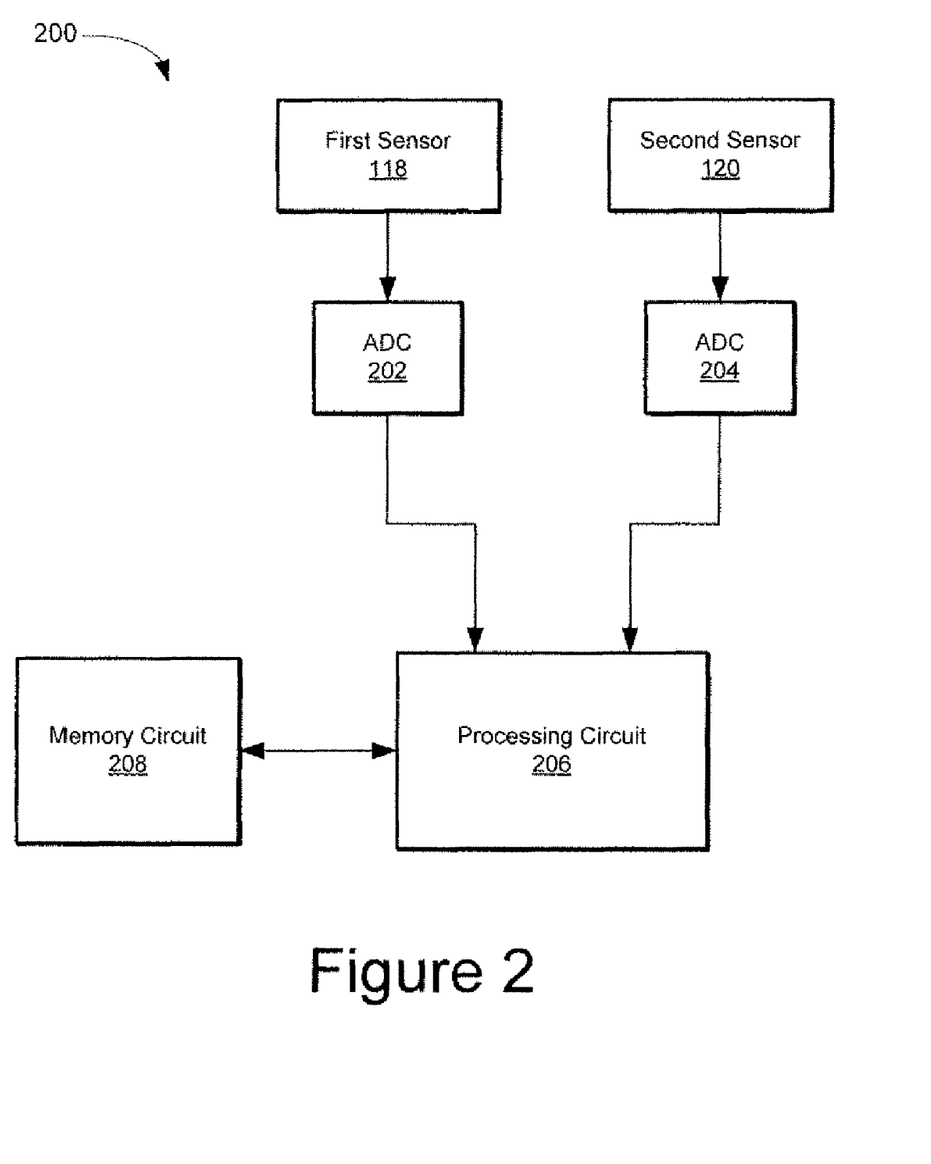
FIG. 2 is a functional block diagram of a preferred embodiment of a vertical displacement detection system using the two beam detection sensors of FIG. 1 to detect vertical displacement.
Figure 3:
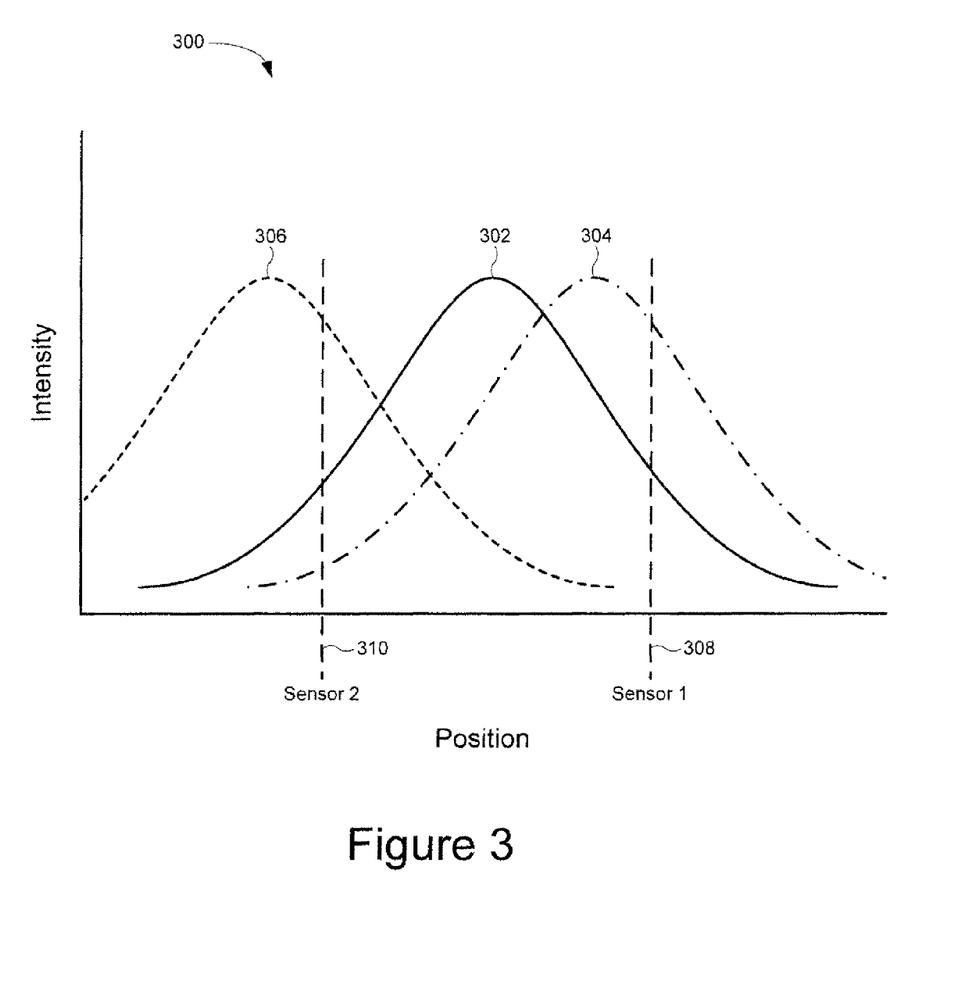
FIG. 3 is an illustration of a graph of one embodiment of the system of FIG. 1 depicting the detected intensity of a reflected light beam.

As explained in more detail with regard to FIG. 2 and FIG. 3, the beam detection sensors 118 and 120 are configured to detect and determine an amount of vertical displacement in the reflected light beam caused by the rotation of the galvanometer 106 and the rotational movement 132 of the photoconductive drum 116. As each of the sensors 118 and 120 are illuminated, they each output a sensor signal indicating their illumination by the reflected light beam. Hence, the first beam detection sensor 118 may output a sensor signal indicating that the reflected light beam has illuminated the first beam detection sensor 118, and the second beam detection sensor 120 may output a sensor signal indicating that the reflected light beam has illuminated the second beam detection sensor 120.

Furthermore, each of the sensors 118 and 120 may output four separate sensor signals as they are each illuminated four times while the galvanometer 106 is rotating clockwise and counter-clockwise. Accordingly, the first beam detection sensor 118 may output two sensor signals when a reflected light beam illuminates the first beam detection sensor 118 as the galvanometer 106 is rotating clockwise, and the first beam detection sensor 118 may output two sensor signals when a reflected light beam illuminates the first beam detection sensor 118 as the galvanometer 106 is rotating counter-clockwise. Similarly, the second beam detection sensor 120 may output two sensor signals when a reflected light beam illuminates the second beam detection sensor 120 as the galvanometer 106 is rotating clockwise, and the second beam detection sensor 120 may output two sensor signals when a reflected light beam illuminates the second beam detection sensor 120 as the galvanometer 106 is rotating counter-clockwise.

In one implementation, the sensor signals output by the first beam detection sensor 118 and the second beam detection sensor 120 indicate the intensity of the reflected light beam. However, the sensor signals output by the beam detection sensor 118 and 120 may also indicate the power of the reflected light beam. The sensor signals output by the beam detection sensor 118 and 120 may also indicate the subjective position or objective position of the reflected light beam. Where the sensor signals output by the beam detection sensors 118 and 120 are indicative of position, the sensor signals may indicate position as measured in mils, micrometers, millimeters, centimeters, inches, and any other measurement of distance or combinations thereof.

The sensor signals output by the beam detection sensors 118 and 120 may be used to determine whether there is vertical displacement in the reflected light beam. For example, the sensor signals output by the first beam detection sensor 118, the second beam detection sensor 120, or combinations, thereof, may be compared with one or more predetermined vertical alignment values to determine whether the reflected light beam is vertically aligned. Furthermore, the differences in the predetermined vertical alignment values with the sensor signals output by the beam detection sensors 118 and 120 may indicate the amount of vertical displacement of the reflected light beam with regard to the position of the sensors 118 and 120. The one or more vertical alignment values may be determined based on the horizontal rotation of the galvanometer 106, the rotational movement 132 of the photoconductive drum 116, the intensity of the reflected light beam, or combinations thereof. The one or more vertical alignment values may indicate intensity, power, distance, position, or combinations thereof.

Determining the amount of horizontal and vertical displacement in the reflected light beam may involve using the sensor signals output by the beam detection sensors 118 and 120 individually or in combination. In one preferred embodiment, the sensor signals output by the beam detection sensors 118 and 120 are summed, and the summation of the sensor signals are compared with a predetermined horizontal alignment value. Where the summation of the signals from the beam detection sensors 118 and 120 is different than the predetermined horizontal alignment value, the difference would indicate horizontal displacement of the reflected light beam. The difference between the summation of the signals from the beam detection sensors 118 and 120 and the horizontal alignment value may be output or stored as a horizontal displacement value.

Alternatively, a vertical alignment value may be stored for each of the sensors 118 and 120. In one implementation, when the beam detection sensor 118 outputs a sensor signal, its sensor signal is compared with a first sensor vertical alignment value, and when the beam detection sensor 120 outputs a sensor signal, its sensor signal is compared with a second sensor vertical alignment value. In this implementation, where one, or both, of the sensor signals are different than their corresponding vertical alignment values, a determination may be made that there is vertical displacement in the reflected light beam. Alternatively, the difference between the outputted sensor signals may be output or stored as a vertical displacement value. The vertical displacement values may indicate an amount of vertical correction to vertically align the reflected light beam with the first beam detection sensor 118, the second beam detection sensor 120, or combinations thereof.

In yet another implementation, the sensor signals output by the beam detection sensors 118 and 120 may be used in and of themselves to determine whether there is vertical displacement in the reflected light beam and the amount of vertical displacement in the reflected light beam, if any. For example, and as discussed above, the summation of the sensor signals output by the beam detection sensors 118 and 120 may be used to determine whether there is horizontal displacement in the reflected light beam. In addition, the difference between the values of the sensor signals output by the beam detection sensors 118 and 120 may be computed to determine vertical displacement in the reflected light beam. The resulting difference may indicate whether there is vertical displacement towards the first beam detection sensor 118, vertical displacement towards the second beam detection sensor 120, or combinations thereof. Furthermore, using the computed difference, one or more corresponding vertical correction values may be determined for each of the beam detection sensors 118 and 120 that indicate an amount of vertical correction to vertically align the reflected light beam with the first beam detection sensor 118, the second beam detection sensor 120, or both. The one or more vertical correction values may indicate intensity, power, distance, position, or combinations thereof.

In addition, the determination of whether there is vertical displacement in the reflected light beam may be based on principles of statistical process control or tolerance errors. With regard to tolerance errors, the image forming system 100 may be configured such that degrees of tolerance allow for vertical displacement in the reflected light beam. For example, a 1% tolerance of error may allow the reflected light beam to be vertically tilted by 1% with respect to the first beam detection sensor 118, the second beam detection sensor 120, or combinations thereof. Hence, the image forming system 100 may determine that there is no vertical correction where the vertical alignment of the reflected light beam is off by 1%. However, the image forming system 100 can also be configured with greater tolerance errors, such as 5% or more, or less tolerance errors, such as 0.5% or no errors. Hence, where the image forming system 100 is configured with tolerance errors, the reflected light beam may or may not be corrected each time the reflected light beam illuminates the beam detection sensors 118 and 120.

With regard to statistical process control, the image forming system 100 may be configured such that the image forming system 100 checks the corrections to the reflected light beam at predetermined intervals when the reflected light beam illuminates the first beam detection sensor 118, the second beam detection sensor 120, or combinations thereof. Hence, the image forming system 100 may make only minor corrections to the reflected light beam and then check the minor corrections to determine whether the minor corrections were enough to correct for the vertical displacement of the reflected light beam, or whether to determine additional further corrections. Alternatively, the image forming system 100 may overcompensate for the vertical displacement of the reflected light beam, and then further refine the vertical alignment of the reflected light beam at one or more predetermined intervals. The predetermined intervals of the statistical process control may include frequent checking of the corrections to the reflected light beam, such as each time the reflected light beam illuminates the beam detection sensors 118 and 120, infrequent checking of the corrections, such as each time the galvanometer 106 completes a clockwise rotation, counter-clockwise rotation, or combinations thereof, at any other predetermined intervals, or combinations thereof.

In correcting for the vertical displacement of the reflected light beam, the image forming system 100 may produce one or more corrected scanlines on the surface of the photoconductive drum 116. FIG. 1 shows that corrected scanlines may include forward-going corrected scanlines 134, reverse-going corrected scanlines 136, or combinations thereof. The image forming system 100 may produce the forward-going corrected scanlines 134 or the reverse-going corrected scanlines 136 in addition or instead of the forward-going scanlines 124 or the reverse-going scanlines 128.

In producing one or more forward-going corrected scanlines 134 or one or more reverse-going corrected scanlines 136, the image forming system 100 may determine one or more vertical mechanical displacement angles, one or more a vertical angles of deflection, or combinations thereof, from the vertical displacement of the reflected light beam. The determined vertical mechanical displacement or the determined vertical angles of deflection may correspond to the computed vertical correction values.

For example, where the image forming system 100 produces 600 DPI using forward-going scanlines 124 and reverse-going scanlines 128, the amount of tilt to correct the imperfections of the forward-going scanlines 124 and reverse-going scanlines 128 may be determined as a change in a vertical beam deflection angle. Changes in a vertical beam deflection angle may correspond to twice the amount of change in a vertical mechanical displacement angle. Thus, changes in the mechanical displacement angle may be small, such as 0.0025°. Thus, in one implementation, the image forming system 100 may be configured to vertically mechanically tilt the mirror 108 0.00125° when the forward-going scanlines 124 are produced, and then vertically mechanically tilt the mirror 108 −0.00125° when the reverse-going scanlines 128 are produced. In this manner, the vertical mechanical tilt of the mirror 108 facilitates the production of substantially parallel scanlines 134 and 136 to each other on the surface of the photoconductive drum 116. However, depending on the amount of pixel error caused by the rotational movement 132 of the photoconductive drum 116, the vertical mechanical displacement angle may include a range greater than 0.005°.

Furthermore, because the light beams 122 and 126 are swept across the surface of the photoconductive drum 116, the amount of vertical mechanical displacement may change continuously as to correct for the detected vertical tilt. However, a fixed amount of vertical tilt may be computed in addition to continuously changing vertical angles of deflection to correct for some manufacturing tolerance that causes a fixed offset.

In correcting the vertical displacement of the reflected light beam, the image forming system 100 may use a piezoelectric actuator or other correcting component as described in U.S. patent application Ser. No. 11/958,092 entitled "Mechanical Galvanometer Tilt Correction", filed Dec. 17, 2007, which is incorporated by reference in its entirety.

FIG. 2 is a functional block diagram of a preferred embodiment of a vertical displacement detection system 200 using the two beam detection sensors 118 and 120 of FIG. 1 to detect vertical displacement in the reflected light beam. In one implementation, the vertical displacement detection system 200 includes the two beam detection sensors 118 and 120 in communication with a processing circuit 206 and a memory circuit 208. The processing circuit 206 may be a general processor, a data signal processor, graphics card, graphics chip, personal computer, motherboard, memories, buffers, scan converters, filters, interpolators, field programmable gate array, application-specific integrated circuit, analog circuits, digital circuits, combinations thereof, or any other now known or later developed processor. Alternatively, or in addition, the processing circuit 206 may be software written in a computer programming language. The memory circuit 208 may be random access memory, cache memory, dynamic random access memory, static random access memory, flash memory, virtual memory, video memory, magnetic memory, optical memory, any known or later developed memory technology, or combinations thereof. The vertical displacement detection system 200 may be integral to the image forming system 100, in communication with the image forming system 100, as part of a system external to the image forming system 100, or combinations thereof.

As discussed above, the first beam detection sensor 118 is operable to output a first sensor signal indicative of the reflected light beam illuminating the first beam detection sensor 118, and the second beam detection sensor 120 is operable to output a second sensor signal indicative of the reflected light beam illuminating the second beam detection sensor 120. The sensor signals output by the sensors 118 and 120 are output to the processing circuit 206, to the memory circuit 208, or combinations thereof. In one implementation, the sensor signals output by the beam detection sensors 118 and 120 are analog signals. The analog signals may then be manipulated by the processing circuit 206 or the memory circuit 208. Alternatively, one or more analog-to-digital converters may convert the analog signals to digital signals. For example, FIG. 2 shows that a first analog-to-digital converter 202 is in communication with the first beam detection sensor 118 and operable to convert the sensor signal output by the first beam detection sensor 118 to a digital signal, and that a second analog-to-digital converter 204 is in communication with the second beam detection sensor 120 and operable to convert the sensor signal output by the second beam detection sensor 120 to a digital signal. However, in an alternative implementation, a single analog-to-digital converter (not shown) in communication with a multiplexer (not shown) may be operable to convert analog sensor signals output by the beam detection sensors 118 and 120 to digital signals or values.

The processing circuit 206 is operable to process the sensor signals output by the beam detection sensors 118 and 120. In one embodiment, the processing circuit 206 provides horizontal synchronization timing information from the illumination of the first beam detection sensor 118 and the second beam detection sensor 120. For example, the horizontal synchronization timing information may be computed from the summation of the values output by the beam detection sensors 118 or 120, selected from one of the two sensors 118 and 120, or determined based on the largest signal output from the sensors 118 and 120.

Although the processing circuit 206 may determine horizontal synchronization timing information from aligned sensors 118 and 120 as shown in FIG. 1, the processing circuit 206 may determine horizontal synchronization timing information from staggered sensors 118 and 120. Where the sensors 118 and 120 are staggered horizontally, the processing circuit 206 may determine the horizontal synchronization timing information based on the peak values output by each sensor and the time difference of when the sensors output the peak values. The processing circuit 206 may use the time difference to calculate the velocity of the light beam and use the time difference to better control the horizontal position of the pixel data since the processing circuit 206 may determine the light beam velocity at the start and end of its sweeps across the surface of the photoconductive drum 116.

As the processing circuit 206 may be in communication with the memory circuit 208, the processing circuit 206 may be operable to store one or more values indicative of the sensor signals in the memory circuit 208. The memory circuit 208 may store the values indicative of the sensor signals as digital values, analog values, or combinations thereof. The memory circuit 208 may also store one or more of the predetermined vertical alignment values previously discussed. The memory circuit 208 may also store the results of the processing circuit 206 operating on the sensor signals of the beam detection sensors 118 and 120.

The processing circuit 206 may perform one or more operations in determining whether there is vertical displacement in the reflected light beam, and one or more operations in determining the amount of vertical displacement in the reflected light beam. The processing circuit 206 may also determine an amount of vertical correction to vertically align the reflected light beam with the first beam detection sensor 118, the second beam detection sensor 120, or combinations thereof.

With regard to determining whether there is vertical displacement in the reflected light beam, the processing circuit 206 may, in one implementation, compare the value of the first sensor signal and the value of the second sensor signal with a vertical alignment value. Alternatively, the processing circuit 206 may compare the value of the first sensor signal with a corresponding first vertical alignment value and the value of the second sensor signal with a corresponding second vertical alignment value to determine whether there is vertical displacement in the reflected light beam. In another implementation, the processing circuit 206 may compute the difference of the value output by the first beam detection sensor 118 with the value output by the second beam detection sensor 120. As discussed above, the resulting difference may indicate whether there is vertical displacement towards the first beam detection sensor 118, vertical displacement towards the second beam detection sensor 120, or combinations thereof. Furthermore, using the computed difference, the processing circuit 206 may compute one or more corresponding vertical correction values. The one or more vertical correction values may indicate the amount of vertical correction to vertically align the reflected light beam with the first beam detection sensor 118, the second beam detection sensor 120, or both. The vertical correction values may correspond to vertical mechanical displacement angles, to vertical angles of deflections, or combinations thereof.

In addition, the vertical displacement detection system 200 may be configured to determine vertical displacement in the reflected light beam using principles of statistical process control or tolerance errors. With regard to tolerance errors, the memory circuit 208 may store one or more values indicative of degrees of tolerance allowable for vertical displacement in the reflected light beam. For example, the memory circuit 208 may store values indicative of a 1% tolerance of error, greater than 1% tolerance of error, less than 1% tolerance of error, or combinations thereof. The processing circuit 206 may then use the tolerance of error stored in the memory circuit 208 to determine that there is no vertical correction. However, where the vertical displacement in the reflected light beam exceeds the tolerance of error stored in the memory circuit 208, the processing circuit 206 may determine that vertical correction of the reflected light beam is required. Hence, where tolerance errors are used, the reflected light beam may or may not be corrected each time the reflected light beam illuminates the beam detection sensors 118 and 120.

With regard to statistical process control, the vertical displacement detection system 200 may be configured as discussed above, such that the processing circuit 206 checks the corrections to the reflected light beam at predetermined intervals when the reflected light beam illuminates the first beam detection sensor 118, the second beam detection sensor 120, or combinations thereof. Thus, further refinements of corrections to the reflected light beam may be possible.

In addition, the first beam detection sensor 118 or the second beam detection sensor 120 may be individually used for both vertical and horizontal control in the vertical displacement detection system 200. For example, the first beam detection sensor 118 may facilitate control of vertical displacement based on the maximum amplitude of the light beam over a predetermined period of time, and the first beam detection sensor 118 may facilitate control of horizontal displacement based on when the maximum amplitude of the light beam occurred during the predetermined period of time. In a similar manner, the beam detection sensor 120 may be used individually to facilitate control of vertical displacement and to facilitate control of horizontal displacement. Additional arrangements of the beam detection sensors 118 and 120 are also possible.

FIG. 3 is an illustration of a graph 300 of one embodiment of the image forming system 100 depicting the detected intensity of a reflected light beam. The graph 300 shows three different typical Gaussian distribution curves 302, 304, and 306 of the intensity of the reflected light beam. For each of the three Gaussian distribution curves 302, 304, and 306, the reflected light beam is in a different vertical position with respect to the beam detection sensors 118 and 120. The middle Gaussian distribution curve 302 is representative of the reflected light beam being centered between the beam detection sensors 118 and 120. In contrast, the right Gaussian distribution curve 304 indicates that the reflected light beam is vertically displaced more towards the first beam detection sensor 118 than the second beam detection sensor 120. Similarly, the left Gaussian distribution curve 306 indicates that the reflected light beam is vertically displaced more towards the second beam detection sensor 120 than the first beam detection sensor 118.

The vertical dashed lines 308 and 310 indicate the vertical position of the beam detection sensors 118 and 120. Thus, the first vertical dashed line 308 indicates the vertical position of the first beam detection sensor 118, and the second vertical dashed line 310 indicates the position of the second beam detection sensor 120. In one implementation, one or more predetermined vertical alignment values may be stored in the memory circuit 206 that correspond to intensity values of the reflected light beam at the positions indicated by the first vertical dashed line 308 and the second vertical dashed line 310. Thus, when the beam detection sensors 118 and 120 detect the reflected light beam, the processing circuit 206 may retrieve these vertical alignment values from the memory circuit 208 to determine whether there is vertical displacement in the reflected light beam.

Referring back to FIG. 1, and by way of example only, the Gaussian distribution curves 302, 304, and 306 may represent the detection of the reflected light beam by the beam detection sensors 118 and 120 at different predetermined intervals, For example, the middle Gaussian distribution curve 302 may occur when the third mirror 112 initially reflects the reflected light beam onto the beam detection sensors 118 and 120 as the galvanometer 106 starts its clockwise rotation. The right Gaussian distribution curve 304 may then represent the intensity of the detected light beam when the fourth mirror 114 reflects the reflected light beam onto the beam detection sensors 118 and 120 as the galvanometer 106 is finishing its clockwise rotation. In one implementation, the processing circuit 206 may compare the detected sensor values shown in the right Gaussian distribution curve 304 with the detected values shown in the middle Gaussian distribution curve 302 to determine that there is vertical displacement in the reflected light beam and to determine the amount of that vertical displacement. Alternatively, the processing circuit 206 may compare the detected sensor values shown in the right Gaussian distribution curve 304 with one or more vertical alignment values stored by the memory circuit 208 to determine that there is vertical displacement in the reflected light beam and the amount of that vertical displacement.

In yet a further alternative, the processing circuit 206 may compute the difference of the detected sensor values shown in the right Gaussian distribution curve 304 to determine that there is vertical displacement in the reflected light beam. As shown in FIG. 3, because the intensity of the reflected light beam is greater at the position of the first beam detection sensor 118 than at the position of the second beam detection sensor 120, the resulting difference of the two sensor values would be positive. The resulting positive value may indicate to the processing circuit 206 that the reflected light beam is vertically displaced in the direction of the first beam detection sensor 118 and the amount of that vertical displacement.

Similarly, the left Gaussian distribution curve 306 may represent the intensity of the detected light beam when the fourth mirror 114, again, reflects the reflected light beam onto the beam detection sensors 118 and 120 as the galvanometer 106 is starting its counter-clockwise rotation. In one implementation, the processing circuit 206 may compare the detected sensor values shown in the left Gaussian distribution curve 306 with the detected values shown in the middle Gaussian distribution curve 302 to determine that there is vertical displacement in the reflected light beam towards the second beam detection sensor 120 and to determine the amount of that vertical displacement. Alternatively, the processing circuit 206 may compare the detected sensor values shown in the left Gaussian distribution curve 306 with one or more vertical alignment values stored by the memory circuit 208 to determine that there is vertical displacement in the reflected light beam towards the second beam detection sensor 120 and the amount of that vertical displacement.

In yet a further alternative, the processing circuit 206 may compute the difference of the detected sensor values shown in the left Gaussian distribution curve 306 to determine that there is vertical displacement in the reflected light beam. As shown in FIG. 3, because the intensity of the reflected light beam is greater at the position of the second beam detection sensor 120 than at the position of the first beam detection sensor 118, the resulting difference of the two sensor values would be negative. The resulting negative value may indicate to the processing circuit 206 that the reflected light beam is vertically displaced in the direction of the second beam detection sensor 120 and the amount of that vertical displacement.

Although not shown, a fourth, different Gaussian distribution curve is then possible where the galvanometer is finishing its counter-clockwise rotation and the third mirror 112 reflects the reflected light beam onto the beam detection sensors 118 and 120. However, it is also possible that different Gaussian distribution curves result from the detection of the reflected light beam, or that the same Gaussian distribution curve is detected each time the reflected light beam is reflected onto the beam detection sensors 118 and 120. Furthermore, more or less Gaussian distribution curves are possible where the beam detection sensors 118 and 120 detect the reflected light beam more frequently or less frequently. An example of detecting the reflected light beam less frequently may be where the beam detection sensors 118 and 120 only detect the reflected light beam at the completion of a rotation by the galvanometer 106.

In determining whether there is vertical displacement in the reflected light beam, the processing circuit 206 may continuously sample the values output by the beam detection sensors 118 and 120. For example, the processing circuit 206 may continuously sample the values from the beam detection sensors 118 and 120 to determine the peak values and to record when the peak values occurred. The processing circuit 206 may then use the recorded time and amplitude of the peak for calculating horizontal displacement values, vertical displacement values, or other values. For example, the processing circuit 206 may use the recorded time for horizontal synchronization timing information and the amplitude to record when the peak occurred, and may use the peak amplitude for vertical displacement calculations.

Figure 4:
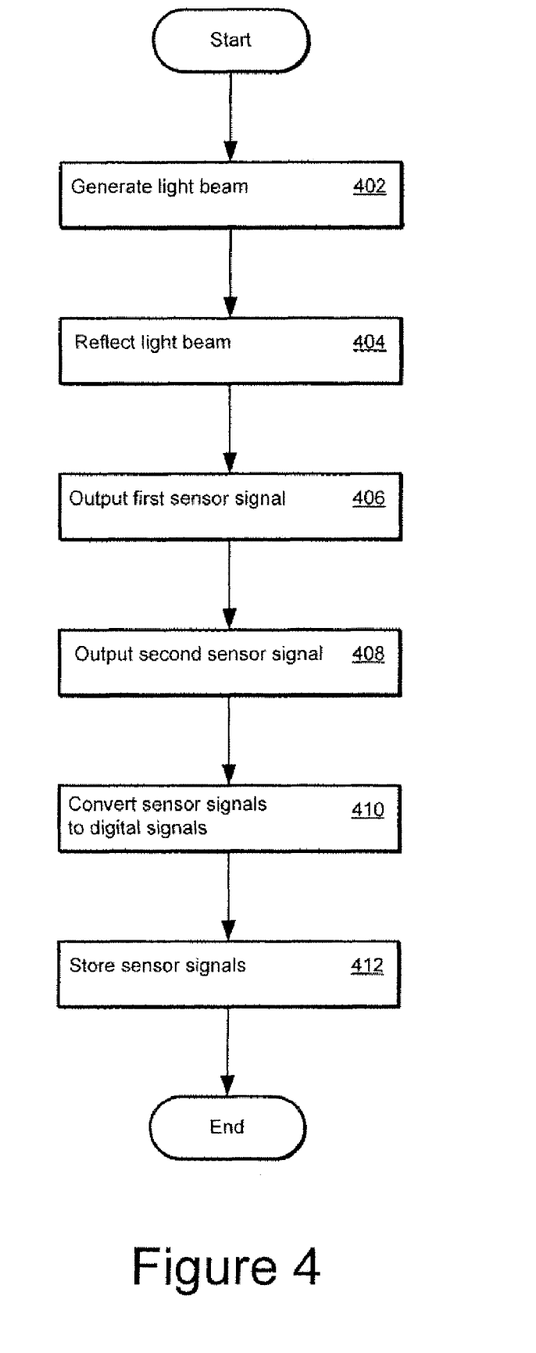
FIG. 4 is a flowchart of a method of a preferred embodiment for detecting and storing sensor signals output by the beam detection sensors of FIG. 1.

FIG. 4 is a flowchart of a method of a preferred embodiment for detecting and storing sensor signals output by the beam detection sensors 118 and 120. Initially, the light source 102 generates a light beam (Act 402). As the galvanometer 106 rotates clockwise and counter-clockwise, this light beam is reflected onto various mirrors, including the mirror 108, the first mirror 104, the second mirror 110, the third mirror 112, and the fourth mirror 114. In one implementation, the third mirror 112 or the fourth mirror 114 reflect the reflected light beam onto the beam detection sensors 118 and 120 (Act 404). However, in alternative implementations, more or less mirrors may reflect the light beam onto the beam detection sensors 118 and 120.

When the reflected light beam is reflected onto the beam detection sensors 118 and 120, the first beam detection sensor 118 initially outputs a sensor signal indicative of the first beam detection sensor 118 being illuminated by the reflected light beam (Act 406). As the reflected light beam sweeps across the beam detection sensors 118 and 120, the second beam detection sensor 120 may then output a sensor signal indicative of the second beam detection sensor 120 being illuminated by the reflected light beam (Act 408). One or more digital-to-analog converters 202 and 204 may then convert the sensor signals output by the first and second beam detection sensors 118 and 120 to digital signals or values (Act 410). In an alternative implementation, the sensor signals output by the beam detection sensors 118 and 120 are not converted.

The sensor signals, either digital or analog, are then sent to the processing circuit 206 for processing. The processing circuit 206 may then generate one or more sensor values from the sensor signals. For example, the processing circuit 206 may generate a first sensor value from the sensor signal of the first beam detection sensor 118, and the processing circuit 206 may generate a second sensor value from the sensor signal of the second beam detection sensor 120. Thereafter, the processing circuit 206 may communicate with the memory circuit 208 to store one or more of the sensor values, sensor signals, or combinations thereof (Act 412).

Figure 5:
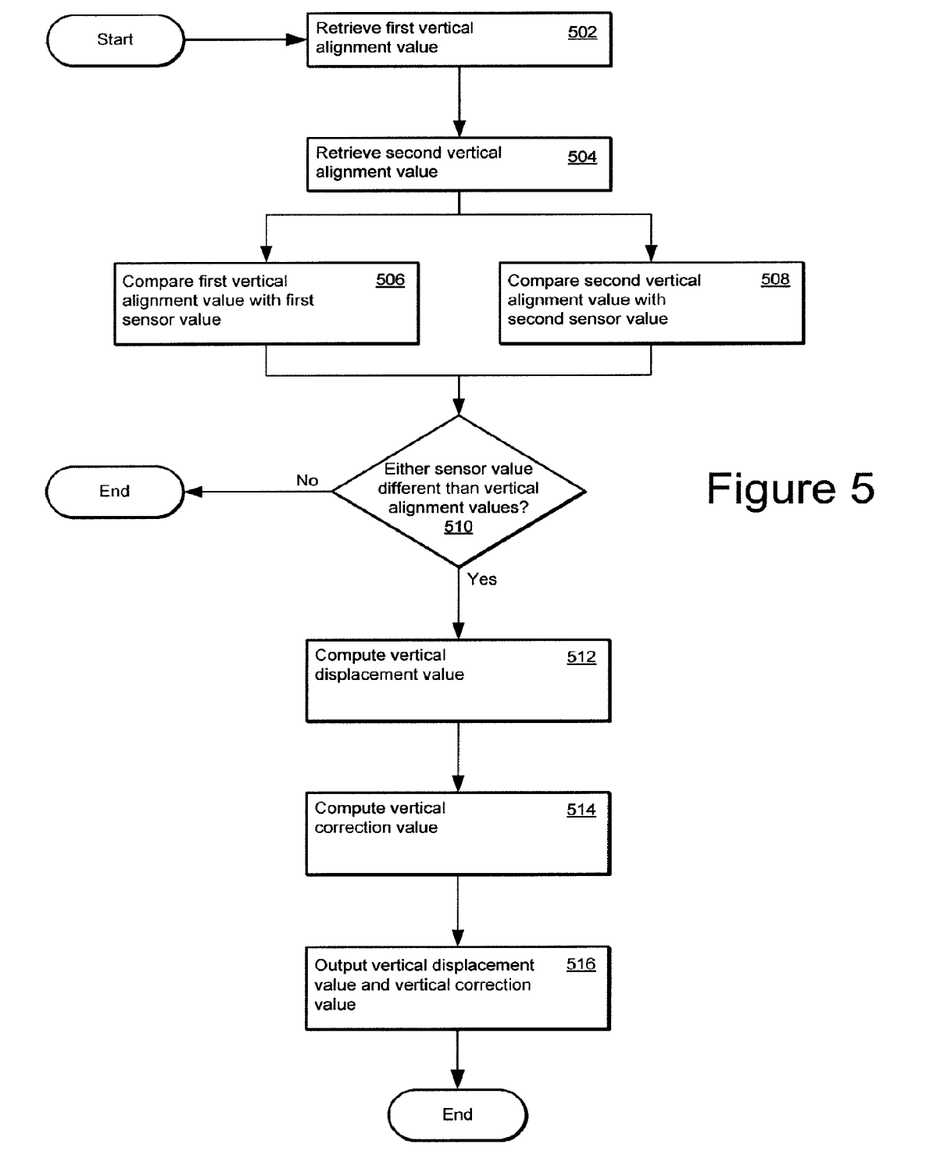
FIG. 5 is a flowchart of a method of a preferred embodiment for determining whether the reflected light beam of FIG. 1 is vertically displaced.

FIG. 5 is a flowchart of a method of a preferred embodiment for determining whether the reflected light beam is vertically displaced. After the processing circuit 206 has stored one or more sensor signals, values, or combinations thereof, the processing circuit 206 may then retrieve a first vertical alignment value from the memory circuit 208 (Act 502) and a second vertical alignment value from the memory circuit 208 (Act 504). The processing circuit 206 may then compare the first vertical alignment value with the first sensor value from the first beam detection sensor 118 (Act 506), and the processing circuit 206 may compare the second vertical alignment value with the second sensor value of the second beam detection sensor 120 (Act 508).

Where the processing circuit 206 compares the sensor values with the vertical alignment values, the processing circuit 206 may determine that the first sensor value, the second sensor value, or both, are different from the vertical alignment values (Act 510). For example, the processing circuit 206 may determine that the first sensor value is greater than the first vertical alignment value or less than the first vertical alignment value. Similarly, the processing circuit 206 may determine that the second sensor value is greater than the second vertical alignment value or less than the second vertical alignment value. Where the processing circuit 206 determines that there is a difference in either comparison, the processing circuit 206 continues to determine the vertical displacement of the reflected light beam (Act 512). However, the processing circuit 206 may alternatively determine that there is little or no change from a desired position in the reflected light beam. In this case, the processing circuit 206 may terminate its determination of vertical displacement in the reflected light beam.

Where the processing circuit 206 has finished determining there is vertical displacement in the reflected light beam, and the processing 206 has finished computing the vertical displacement of the reflected light beam, the processing circuit 206 may then compute a vertical correction value (Act 514). The vertical correction value may be computed using the one or more vertical displacement values, one or more detected sensor values, one or more vertical alignment values, or combinations thereof. The processing circuit 206 may then output the vertical displacement value and the vertical correction value (Act 516). For example, the processing circuit 206 may output the vertical displacement value and the vertical correction value to the memory circuit 206. Alternatively, the processing circuit 206 may output the vertical displacement value and the vertical correction value to a separate circuit or system that corrects the vertical displacement in the reflected light beam. For example, the processing circuit 206 may output the vertical displacement value and the vertical correction value to the controller of a piezoelectric actuator or other component as described in U.S. patent application Ser. No. 11/958,092, entitled "Mechanical Galvanometer Tilt Correction," filed Dec. 17, 2007.

Figure 6:
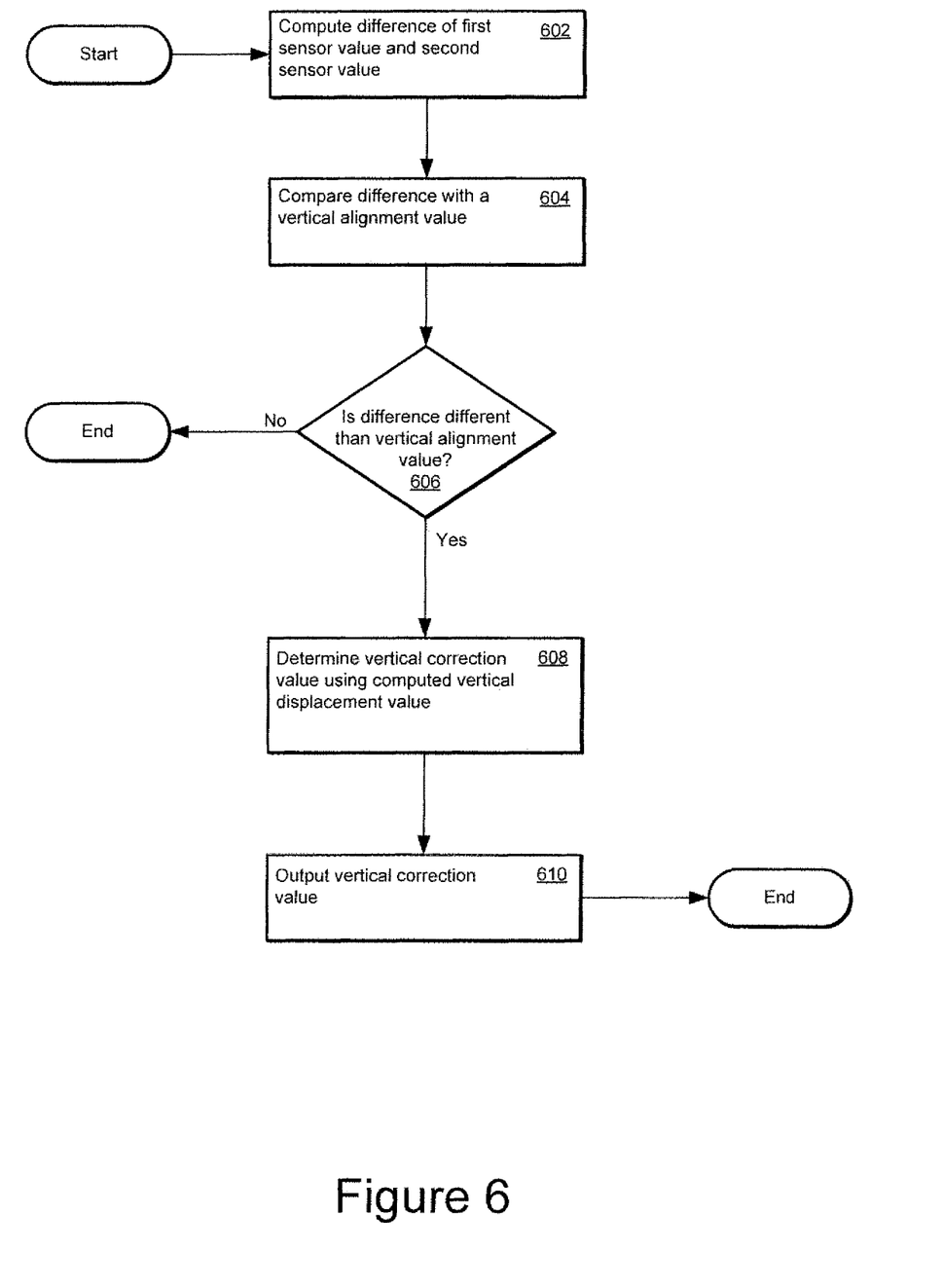
FIG. 6 is a flowchart of another method of another preferred embodiment for determining whether the reflected light beam of FIG. 1 is vertically displaced.

FIG. 6 is a flowchart of another method of another preferred embodiment for determining whether the reflected light beam is vertically displaced. After storing the first sensor value and the second sensor value, the processing circuit 206 may compute the difference of the first sensor value and the second sensor value (Act 602). The processing circuit 206 may then compare the difference of the first and second sensor values with a vertical alignment value stored in the memory circuit 208 (Act 604) and determine whether there is vertical displacement in the reflected light beam (Act 606). Where the processing circuit 206 determines that there is little or no difference in the difference of the first and second sensor values with the vertical alignment value, the processing circuit 206 may determine that there is little or no vertical displacement in the reflected light beam. In this case, the processing circuit 206 may terminate further computations.

Alternatively, the processing circuit 206 may determine that the difference of the first and second sensor values and the vertical alignment value is sufficient to warrant correction in the reflected light beam. For example, the processing circuit 206 may determine that there is an absolute difference in the difference of the first and second values and the vertical alignment value. Alternatively, the processing circuit 206 may determine that the difference of the first and second sensor values deviates sufficiently, such as by more than 3%, from the vertical alignment value that the reflected light beam needs correction. The computed difference in the first and second sensor values may be used to determine a vertical displacement value in the reflected light beam. Thereafter, the processing circuit 206 may use the vertical displacement value to compute a vertical correction value (Act 608). The processing circuit 206 may then output the vertical correction value (Act 610), such as to the memory circuit 206, the controller of the piezoelectric actuator as described in U.S. patent application Ser. No. 11/958,092, or combinations thereof, to correct the vertical displacement in the reflected light beam.

It is intended that the foregoing detailed description be understood as an illustration of selected forms that the invention can take and not as a definition of the invention. It is only the following claims, including all equivalents that are intended to define the scope of this invention.

What is claimed is:

1. A tilt correction controller for a mechanical galvanometer, the tilt correction controller comprising:
   a memory configured to store at least one alignment value indicative of where a reflected light beam is aligned with at least a first sensor and a second sensor; and
   a processor configured to access the at least one alignment value from the memory and receive a first signal indicative of the first sensor being illuminated by the reflected light beam and a second signal indicative of the second sensor being illuminated by the reflected light beam and configured to determine displacement in a sub-scanning direction of the reflected light beam according to the at least one alignment value and the first and second signals,
   wherein the sub-scanning direction is at an angle to a scanning direction of the reflected light beam.

2. The tilt correction controller of claim 1, further comprising:
   a first analog to digital converter configured to output the first signal; and
   a second analog to digital converter configured to output the second signal.

3. The tilt correction controller of claim 1, further comprising:
   a single analog to digital converter configured to output the first signal and the second signal; and
   a multiplexer configured to select the first sensor or the second sensor as input to the single analog to digital converter.

4. The tilt correction controller of claim 1, wherein the first sensor and the second sensor are positioned relative to each other.

5. The tilt correction controller of claim 4, wherein the first sensor abuts the second sensor.

6. The tilt correction controller of claim 5, wherein the first sensor and the second sensor are stacked in a direction generally parallel to the sub-scanning direction.

7. The tilt correction controller of claim 1, wherein the at least one alignment value comprises a first alignment value indicative of where the reflected light beam is aligned with the first sensor and a second alignment value indicative of where the reflected light beam is aligned with the second sensor.

8. The tilt correction controller of claim 7, wherein the processor is configured to compare a first sensor value with the first alignment value stored by the memory and compare a second sensor value with the second alignment value stored by the memory; and
   wherein the processor is configured to determine whether the reflected light beam is displaced when the first sensor value is a different value than the first alignment value or the second sensor value is a different value than the second alignment value.

9. The tilt correction controller of claim 1, wherein the processor is configured to determine a displacement value indicative of an amount of displacement in the reflected light beam by computing a difference in time or intensity of the first signal and the second signal, and to determine an amount of correction to align the reflected light beam based on the difference in time or intensity.

10. A method for controlling a mirror comprising:
    receiving, at a processor, a first sensor value indicative of a first sensor being illuminated by a reflected light beam;
    receiving, at the processor, a second sensor value indicative of a second sensor being illuminated by the reflected light beam; and
    determining, by the processor, displacement in a sub-scanning direction of the reflected light beam according to at least one alignment value and the first and second sensor values, wherein the at least one alignment value is indicative of where a reflected light beam is aligned with at least the first sensor and the second sensor, and wherein the sub-scanning direction is at an angle to a scanning direction of the reflected light beam.

11. The method of claim 10, wherein the first sensor and the second sensor are positioned relative to each other.

12. The method of claim 11, wherein the first sensor abuts the second sensor.

13. The method of claim 12, wherein the first sensor and the second sensor are stacked in a direction generally parallel to the sub-scanning direction.

14. The method of claim 10, wherein the at least one alignment value comprises a first alignment value indicative of a value where the reflected light beam is aligned with the first sensor and a second alignment value indicative of a value where the reflected light beam is aligned with the second sensor.

15. The method of claim 14, further comprising:
    comparing the first sensor value with the first alignment value stored by the memory;
    comparing the second sensor value with the second alignment value stored by the memory; and
    identifying a displacement of the reflected light beam when the first sensor value is a different value than the first alignment value or the second sensor value is a different value than the second alignment value.

16. The method of claim 10, further comprising:
    computing a difference in time or intensity of the first sensor value and the second sensor value; and
    calculating an amount of correction to align the reflected light beam based on the difference in time or intensity of the first sensor value and the second sensor value.

17. A controller for a galvanometer operable to reflect a laser beam in a scanning direction across a photoconductive drum comprising:
- a memory operable to store a plurality of alignment values indicative of where the laser beam is aligned with a plurality of sensors positioned along a direction at an angle greater than zero with the scanning direction; and
- a processor operable to access the plurality of alignment values from the memory and receive at least one signal value indicative of the laser beam illuminating the plurality of sensors in order to determine displacement of the laser beam according to the plurality of alignment values and the at least one signal value.

18. The controller of claim 17, wherein the plurality of sensors are stacked and wherein the direction at the angle greater than zero with the scanning direction is generally perpendicular to a rotating axis of the photoconductive drum.

19. The controller of claim 17, wherein the at least one alignment value comprises a first alignment value indicative of where the laser beam is in alignment with a first sensor and a second alignment value indicative of where the laser beam is in alignment with a second sensor.

20. The controller of claim 17, wherein the at least one signal value comprises a first sensor value and a second sensor value and the plurality of alignment values comprises a first alignment value and a second alignment value, wherein the processor is operable to compare the first sensor value with the first alignment value stored by the memory and compare the second sensor value with the second alignment value stored by the memory; and wherein the processor is operable to determine a displacement of the laser beam when the first sensor value is a different value than the first alignment value or the second sensor value is a different value than the second alignment value.

* * * * *